Patented Feb. 18, 1941

UNITED STATES PATENT OFFICE 2,232,649

LUBRICANT

Laszlo Auer, Bloomfield, N. J., assignor, by mesne assignments, to Gulf Oil Corporation, Pittsburgh, Pa., a corporation of Pennsylvania No Drawing. Original application April 21, 1930, Serial No. 446,172, now Patent No. 2,213,943, dated September 10, 1940. Divided and this application July 12, 1939, Serial No. 284,101. In Hungary May 19, 1926

15 Claims. (Cl. 252—48)

This invention relates to a process for the modification of the physical properties (viscosity, melting point, etc.) of colloidal substances, and more specially to a process for the modification of the physical properties of organic isocolloids whereby improved products useful as lubricants may be obtained. By "isocolloids" or "isocolloidal substances" is meant colloidal substances whereof the dispersed phase and the dispersion medium of the colloidal system are both of the same chemical composition but in a different state.

Starting materials suitable for the treatment according to the present invention are, inter alia, fatty oils, tung oil, linseed oil, fish oils, train oils, poppyseed oil, sunflower oil, cottonseed oil, rape-seed oil, soya bean oil, pineseed oil, corn oil, olive oil, castor oil, resins, synthetic resins containing natural resins, products containing the acids of fatty oils and resins, their derivatives, mineral cylinder oil, heavy mineral oils containing naphthenic acids, goudron (petroleum distillation residue) certain mineral oil products, animal and vegetable waxes, also chemically pure isocolloid bodies, such for instance as styrene, etc.

In my prior application Serial No. 143,786, filed Oct. 23, 1926, I disclosed that the physical properties of natural and artificial isocolloids containing unsaturated carbon compounds may be modified by treating them with certain agents, namely electrolytes or polar compounds. As described in said application, Serial No. 143,786, the organic isocolloid and the electrolyte (polar compound) may be mixed cold or heated together to obtain the desired modification of the isocolloid material.

In my prior copending application Serial No. 359,425, filed April 30, 1929, I described further examples of organic polar compounds useful in my processes. Said application Serial No. 359,425 discloses inter alia, modification of isocolloids by incorporating therein relatively small quantities of certain aromatic (i. e. aryl) sulphonyl chlorides, such as p-toluene sulphonyl chloride and benzene sulphonyl chloride.

In my prior copending application Ser. No. 446,172, filed April 21, 1930, issued as Patent No. 2,213,943, September 10, 1940, of which this application is a division, I disclosed the fact that I have discovered that greatly modified isocolloids (modified in accordance with the disclosures of my prior applications Serial Nos. 143,786 and 359,425) may themselves be used as modifying agents for the same or other isocolloidal materials, and have the advantage of producing modified products with a lighter color than is obtained by the direct use of the above-mentioned modifying agents and frequently at lower temperatures. In my application Serial No. 446,172 I claim certain improved lubricants produced by the two-step methods described therein wherein aromatic sulfonic acids, are used as the polar compound or modifying agent. One of the compounded lubricants there claimed, useful in lubricating metals, is a lubricant comprising a major amount of a mineral oil and a relatively small amount of 2:5 dichlorbenzene sulfonic acid.

Included within the starting materials referred to in my prior applications Serial Nos. 359,425 and 446,172 are various fatty oils and mineral oils, as listed above. Included among the various initial modifying agents listed in those applications are naphthalene sulphonyl chloride, para toluene sulphonyl chloride and benzene sulphonyl chloride.

The present divisional application relates in particular to the modification of refined mineral oils for lubricating purposes, with such aryl sulphonyl chlorides. Thus, as disclosed in Serial No. 446,172, I have carried out experiments to produce a new type of dispersed phase in those organic isocolloidal systems in which the tendency (capacity) for an increase in the dispersed phase concentration is very small, especially for example in refined mineral oils which do not contain naphthenic acids. I have found that modified fatty oil products (modified by incorporation therein of an aryl sulphonyl chloride, as aforesaid), when dissolved in small percentages in mineral oils are able to increase their viscosity. If the solidified, modified oil products are hard enough, or when the percentage dissolved in mineral oil is slightly increased, it is possible to produce pasty, jelly-like materials which can be used as lubricating greases. Obviously, with lesser amounts of the solidified, modified oil products, the resultant solutions in mineral oil are inherently less viscous, the final increase in viscosity being naturally dependent upon the amount of the modified oil products present.

Such modification of lubricating oils (as, for instance, by increasing the viscosity thereof) has considerable importance in industry. In the case of lubricants, it is very important that the lubricating oil should not emulsify readily with water and thus be washed out from engines exposed to weather. I have found that solidified oils which contain modifying agents insoluble in water are especially advantageous for use as thickening agents for mineral oils, as the lubricants so obtained do not show any emulsifying capacity with water.

A further important point regarding lubricants is the requirement that they should be ash free, as the ash content has been found to damage the metal parts to be lubricated. From this point of view, metal-free organic modifying agents such as aromatic sulphonyl chlorides are advantageously used in modifying the fatty oils or resins to be used in connection with mineral oils.

It has been further found that the presence of saponifiable matter in a lubricating oil is also disadvantageous to a certain extent, for in contact with alkali there is a tendency to form soaps which tend (by the action of water) to form emulsions. I have found that amongst the organic reagents disclosed in my prior applications referred to, aromatic sulphonyl chlorides, such as naphthalene sulphonyl chloride, toluene sulphonyl chloride, and benzene sulphonyl chloride, are reagents which produce unsaponifiable products equally from fatty oils and from resins. Such products can therefore be used with great advantage as thickening agents for lubricating purposes in mineral oils.

As disclosed in my prior copending applications referred to, the incorporation of the aryl sulphonyl chloride in the organic isocolloid, such as the fatty oils, may be variously effected, the use of elevated temperatures being advisable wherever this facilitates solution or dispersion. The amount of the initial modifying agent used is normally from 2 to 10 per cent by weight of the isocolloid starting material, but may be as high as 30 per cent, the degree of modification of the intermediate product being increased as more of the initial modifying agent is employed.

The modified fatty oil product thus obtained is readily incorporated in mineral oils.

Heat treatment, in the course of the modification of the initial isocolloid material, is often effective to assure complete dissolution or dispersion of the initial modifying agent in the fatty oil or other isocolloid being modified, the degree of heat necessary depending upon the nature of the substances under treatment and also the modifying agent used. Generally temperatures from 100° to 300° C. or more give satisfactory results. The heat treatment promotes the complete (molecular or colloidal) dissolution of the initial modifying agent in the substances to be treated. In some cases it may be advisable to continue the heat treatment after the dissolution or dispersion of the modifying agent is substantially complete.

The modification of the initial isocolloid starting material is also affected by pressure, reduction of pressure tending to intensify the action of the modifying agent. The tendency toward formation of more viscous products is, however, less when plus pressures are used.

Air or other gas may be passed through the reaction mixture during the treatment.

Ordinarily, the treatment of the initial isocolloid material, such as a fatty oil, with the initial modifying agent i. e., aryl sulphonyl chloride, tends to produce a somewhat more viscous, sometimes even a solid, modification product.

The initial modified materials prepared by modifying fatty oils and other isocolloids are readily incorporated in the same or other organic isocolloids, more particularly mineral oils, because of their inherent solubility or dispersibility in the latter, resulting in the formation of improved lubricating materials of somewhat increased viscosity.

By way of specific example, a fatty oil, such as linseed oil, may be modified with the aid of a relatively small quantity of benzene sulphonyl chloride and the resultant modified material incorporated in a relatively large amount of refined mineral oil, the final products varying from viscous liquids to jelly-like materials of the nature of lubricating greases in accordance with the proportions employed.

What I claim is:

1. An improved lubricant composition comprising a major amount of a mineral oil and a minor amount of an aryl sulphonyl chloride incorporated therein.

2. As an improved mineral oil lubricant, a lubricating composition comprising a major amount of mineral oil and minor amounts of an aryl sulphonyl chloride and of fatty oil blended therewith.

3. The composition of claim 2 wherein said fatty oil is a bodied oil.

4. The composition of claim 2 wherein the said fatty oil is a blown rape-seed oil.

5. The composition of claim 2 wherein the said fatty oil is linseed oil.

6. As a composition of matter useful as a lubricant, a uniform composition comprising a major amount of a mineral oil and a minor amount of an aryl sulphonyl chloride dissolved therein.

7. The composition of claim 6 wherein said aryl sulphonyl chloride is benzene sulphonyl chloride.

8. The composition of claim 6 wherein said aryl sulphonyl chloride is p-toluene sulphonyl chloride.

9. The composition of claim 6 wherein said sulphonyl chloride is naphthalene sulphonyl chloride.

10. In the manufacture of improved lubricants, the process which comprises incorporating an aryl sulphonyl chloride in a fatty oil, and blending a minor amount of the thereby modified product with a major amount of a mineral oil.

11. A lubricating grease comprising a major amount of a refined mineral oil, and minor amounts of a fatty oil and an aryl sulphonyl chloride.

12. As a new product, a compounded lubricant useful in lubricating metals, said lubricant comprising a major amount of a mineral oil and a relatively small amount of benzene sulphonyl chloride, the amount thereof not exceeding 30 per cent of the mineral oil.

13. In the manufacture of improved compound mineral oils useful as a lubricant for metals, the improved process which comprises dispersing benzene sulphonyl chloride in an oil and then blending that mixture with a relatively large amount of mineral oil to obtain said compounded lubricant containing a minor amount of benzene sulphonyl chloride dispersed therein.

14. In the manufacture of compound mineral oils useful as lubricants, the improved process which comprises first heat bodying a fatty oil in the presence of 2 to 30 per cent of an aryl sulphonyl chloride to produce a thickened, nonoxidized heat-bodied fatty oil containing the aryl sulphonyl chloride dissolved therein and then dispersing a minor amount of said heat-bodied oil containing the aryl sulphonyl chloride dissolved therein in a mineral oil to produce said compound lubricant.

15. As a new product, a compounded mineral oil useful as a lubricant for metals comprising a liquid mineral oil and a thickened, nonoxidized heat-bodied fatty oil dispersed therein, said heat-bodied fatty oil containing an aryl sulphonyl chloride dissolved therein.

LASZLO AUER.